United States Patent
Ishikawa

(10) Patent No.: US 11,167,786 B2
(45) Date of Patent: Nov. 9, 2021

(54) STEERING SHAFT AND METHOD OF MANUFACTURING STEERING SHAFT

(71) Applicant: YAMADA MANUFACTURING CO., LTD., Kiryu (JP)

(72) Inventor: Tomoya Ishikawa, Kiryu (JP)

(73) Assignee: YAMADA MANUFACTURING CO., LTD., Kiryu (JP)

(*) Notice: Subject to any disclaimer, the term of this patent is extended or adjusted under 35 U.S.C. 154(b) by 45 days.

(21) Appl. No.: 16/774,583

(22) Filed: Jan. 28, 2020

(65) Prior Publication Data
US 2020/0307671 A1 Oct. 1, 2020

(30) Foreign Application Priority Data
Mar. 26, 2019 (JP) .............................. JP2019-058415

(51) Int. Cl.
| | |
|---|---|
| *B62D 1/185* | (2006.01) |
| *F16J 15/08* | (2006.01) |
| *B62D 1/20* | (2006.01) |
| *F16J 15/3232* | (2016.01) |

(52) U.S. Cl.
CPC .............. *B62D 1/185* (2013.01); *B62D 1/20* (2013.01); *F16J 15/0881* (2013.01); *F16J 15/3232* (2013.01)

(58) Field of Classification Search
CPC ... B62D 1/16; B62D 1/185; B62D 1/20; F16J 15/0881; F16J 15/3232; F16D 3/84; F16D 3/845; F16D 3/848
See application file for complete search history.

(56) References Cited

U.S. PATENT DOCUMENTS

| | | | | | |
|---|---|---|---|---|---|
| 5,657,545 | A | * | 8/1997 | Haworth | B62D 1/16 33/1 N |
| 6,325,724 | B1 | * | 12/2001 | Sato | F16D 3/40 464/114 |
| 2007/0066409 | A1 | * | 3/2007 | Sekine | F16D 1/0864 464/179 |
| 2009/0270188 | A1 | * | 10/2009 | Yamada | F16J 15/3252 464/162 |
| 2015/0330457 | A1 | * | 11/2015 | Koiso | F16D 3/26 403/235 |
| 2020/0182305 | A1 | * | 6/2020 | Seidel | F16D 3/843 |
| 2020/0307673 | A1 | * | 10/2020 | Ishikawa | F16J 15/3232 |

FOREIGN PATENT DOCUMENTS

| | | | | |
|---|---|---|---|---|
| JP | 61-143966 | | 9/1986 | |
| JP | 10331861 | A * | 12/1998 | |
| JP | 2007321924 | A * | 12/2007 | ............. F16C 27/04 |
| JP | 2010181016 | A * | 8/2010 | |

* cited by examiner

*Primary Examiner* — Laura Freedman
(74) *Attorney, Agent, or Firm* — Rankin, Hill & Clark LLP

(57) ABSTRACT

A steering shaft according to an aspect of the present invention includes an upper shaft, a lower shaft, and a seal cap. The seal cap includes a seal which comes into close contact with an inner peripheral surface of the upper shaft and a closure which bulges upward with respect to the seal. The closure is plastically deformed downward, and thus, the seal cap is held in an upper end opening portion in a state where the seal is pressed against the inner peripheral surface of the upper shaft.

5 Claims, 4 Drawing Sheets

STEERING SHAFT AND METHOD OF MANUFACTURING STEERING SHAFT

INCORPORATED DESCRIPTION OF RELEVANT APPLICATION

Priority is claimed on Japanese Patent Application No. 2019-058415, filed on Mar. 26, 2019, the content of which is incorporated herein by reference.

BACKGROUND OF INVENTION

Field of Invention

The present invention relates to a steering shaft and a method of manufacturing a steering shaft.

Background Art

A steering shaft having an intermediate shaft (hereinafter, simply referred to as an intermediate shaft) is known. The intermediate shaft connects between a shaft main body to which a steering wheel is coupled and a steering gear box coupled to a wheel. The intermediate shaft includes a tubular outer shaft and an inner shaft which is inserted into the outer shaft. The inner shaft is configured to be movable relative to the outer shaft in an axial direction and to be rotatable integrally with the outer shaft.

For example, the above-described intermediate shaft is disposed at a position exposed to an external environment in an engine room. For this reason, there is a possibility that water or the like may enter a fitting portion of the intermediate shaft at the time of splashing of water during running-up or when submerged. If water or the like enters the fitting portion of the intermediate shaft, the intermediate shaft may corrode.

Accordingly, for example, Japanese Unexamined Utility Model Application, First Publication No. S61-143966 discloses a configuration in which a sealing lid is fixed into an outer shaft by press fitting or the like and an opening portion of the outer shaft is closed.

However, as in the above-described related art, in a case where ensuring of sealing performance between the sealing lid and the outer shaft or retaining of the sealing lid is achieved only by a press-fitting load (friction force), it is necessary to manage fitting dimensions (press-fitting margin) of the sealing lid or the outer shaft with high accuracy.

With respect to this, it is also conceivable to caulk an opening end of the outer shaft after the sealing lid is press-fitted. However, in this case, a caulking step is required after the press fitting. Accordingly, the number of manufacturing steps increases, and there is a possibility that the manufacturing cost increases.

An aspect of the present invention provides a steering shaft and a method of manufacturing a steering shaft capable of improving manufacturing efficiency, decreasing a cost, and securing sealing performance between a seal cap and an outer shaft over a long period of time.

In order to solve the above-described problems, the present invention adopts the following aspects.

(1) According to an aspect of the present invention, there is provided a steering shaft including: a tubular outer shaft; an inner shaft configured to be inserted into the outer shaft, to be movable in an axial direction relative to the outer shaft through an opening portion of the outer shaft on a first side in the axial direction, and to be rotatable integrally with the outer shaft; and a seal cap configured to close an opening portion of the outer shaft on a second side in the axial direction. The seal cap includes a seal configured to come into close contact with an inner peripheral surface of the outer shaft, and a closure configured to be continuous with an inner peripheral side of the seal and bulge to the second side in the axial direction with respect to the seal. The closure is plastically deformed to the first side in the axial direction, and thus, the seal cap is held in the opening portion on the second side in a state where the seal is pressed against the inner peripheral surface of the outer shaft. According to another aspect of the present invention, there is provided a method of manufacturing a steering shaft, including: a pushing step of pushing the closure to the first side in the axial direction with respect to the seal in a state where the seal cap is inserted into the opening portion on the second side of the outer shaft.

In the pushing step, the closure is plastically deformed toward the first side in the axial direction, and thus, the seal comes into close contact with the inner peripheral surface of the outer shaft.

In the present aspect, the opening portion on the second side of the outer shaft is closed by the seal cap. Accordingly, it is possible to prevent water or the like from entering the steering shaft through the opening portion on the second side of the outer shaft. Thereby, corrosion or the like of the steering shaft can be suppressed and durability can be improved. Accordingly, axial movements of the outer shaft and the lower shaft is smoothly performed over a long period of time.

In the present aspects, the seal is pressed against the inner peripheral surface of the outer shaft by the plastic deformation of the closure, and thus, a seal load can be appropriately adjusted according to an amount of pushing of the closure. Accordingly, compared to a case where managing fitting dimensions or the like are managed to adjust a press-fitting load as in the related art, the dimensions are easily managed.

The assembly of the seal cap is completed by pushing the closure. Accordingly, compared to a case where a caulking step is performed after press fitting as in the related art, manufacturing efficiency can be improved or a cost can be reduced.

As a result, the manufacturing efficiency is improved and the cost is reduced, and thus, it is possible to secure sealing performance between the seal cap and the outer shaft for a long period of time.

(2) In the steering shaft according to (1), a first restriction configured to abut against the seal cap in the axial direction and restrict a movement of the seal cap with respect to the outer shaft toward the first side in the axial direction may be formed in a portion of the outer shaft located on the first side in the axial direction from the seal.

In the present aspect, at least the outer peripheral edge of the seal cap before the assembly overlaps the first restriction when viewed in the axial direction. Accordingly, when the seal cap is inserted into the outer shaft, the seal cap can be positioned with respect to the outer shaft in the axial direction by the first restriction. Accordingly, it is possible to improve assembling property.

Meanwhile, the movement of the seal cap to the first side in the axial direction with respect to the outer shaft can be restricted by the first restriction even after the assembly. Accordingly, removal or the like of the seal cap can be suppressed.

(3) In the steering shaft according to (1) or (2), a second restriction configured to abut against the seal cap in the axial direction in a state where the closure is plastically deformed and restrict a movement of the seal cap with respect to the outer shaft toward the second side in the axial direction may be formed in a portion of the outer shaft located on the second side in the axial direction from the seal.

In the present aspect, the movement of the seal cap to the second side in the axial direction with respect to the outer shaft can be restricted by the second restriction even after the assembly. Accordingly, removal or the like of the seal cap can be suppressed.

The seal cap before the assembly does not overlap the second restriction from viewed in the axial direction. Accordingly, an interference between the seal cap and the second restriction can be suppressed when the seal cap is inserted into the outer shaft. As a result, it is possible to improve the assembling property.

(4) In the steering shaft according to any one of (1) to (3), each of the outer shaft and the seal cap may be formed in a circular shape when viewed in the axial direction.

In the present aspect, a radius of the seal cap can be formed uniformly over the entire periphery. Therefore, the seal is easily spread evenly during the plastic deformation. As a result, the seal load can be applied uniformly to the entire periphery of the inner peripheral surface of the outer shaft.

(5) According to still another aspect of the present invention, there is provided a steering shaft including: a shaft main body to which a steering wheel is coupled and an intermediate shaft which is the above-described slide shaft which is coupled to a front end portion of the shaft main body.

According to the aspect, the steering shaft is provided, and thus, it is possible to provide the steering device having excellent durability. The steering shaft according to the present aspect can be applied to any one of (1) to (4).

Effect of Invention

According to each aspect, it is possible to improve manufacturing efficiency, decrease a cost, and secure sealing performance between the seal cap and the outer shaft over a long period of time.

DETAILED DESCRIPTION OF INVENTION

Figure 1:
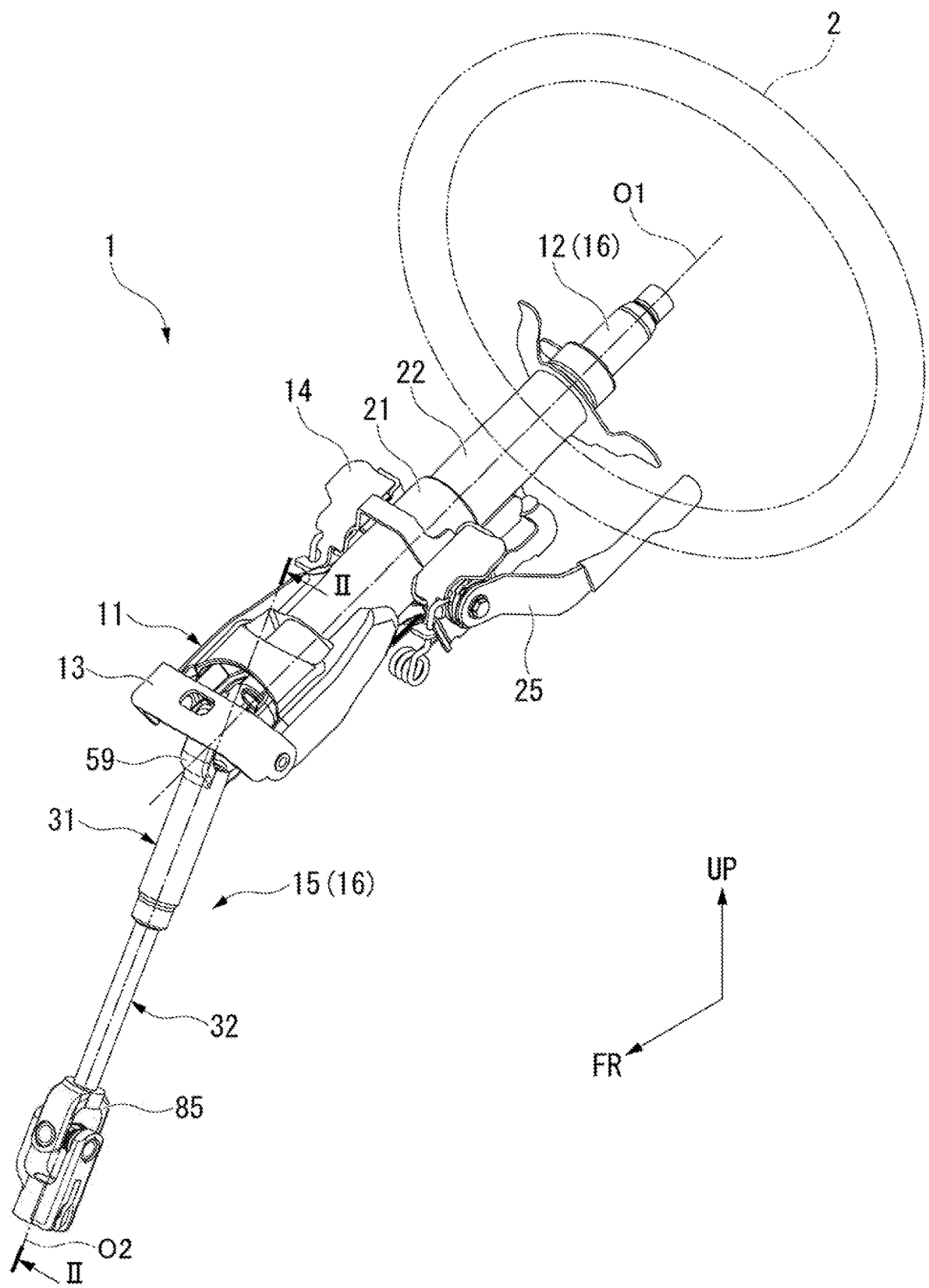
FIG. 1 is a perspective view of a steering device according to an embodiment.

Next, an embodiment of the present invention will be described with reference to the drawings.
[Steering Device]
FIG. 1 is a perspective view of a steering device 1.
As shown in FIG. 1, the steering device 1 is mounted on a vehicle. The steering device 1 adjusts a steering angle of a wheel according to a rotation of a steering wheel 2.
The steering device 1 includes a column unit 11, a shaft main body 12, fixing brackets (front bracket 13 and rear bracket 14), and an intermediate shaft (slide shaft) 15. Each of the column unit 11 and the shaft main body 12 is formed along a first axis O1. Therefore, in the following descriptions, a direction in which the first axis O1 of the column unit 11 and the shaft main body 12 extends may be simply referred to as a first axis direction, a direction orthogonal to the first axis O1 may be referred to as a first radial direction, and a direction around the first axis O1 may be referred to as a first circumferential direction. The shaft main body 12 and the intermediate shaft 15 constitute a steering shaft 16 according to this embodiment.

The steering device 1 of the present embodiment is mounted on a vehicle in a state where the first axis O1 intersects a front-rear direction. The first axis O1 of the steering device 1 extends upward as the first axis O1 goes rearward. However, in the following descriptions, for the sake of convenience, in the steering device 1, a direction toward the steering wheel 2 in the first axis direction is simply referred to as a rear, and a direction toward a side opposite to the steering wheel 2 is simply referred to as a front (arrow FR). Further, in the first radial direction, an up-down direction in a state where the steering device 1 attached to the vehicle is simply an up-down direction (arrow UP is upward), and a right-left direction is simply a right-left direction.

The column unit 11 includes an outer column 21 and an inner column 22.

The outer column 21 is attached to a vehicle body via the fixing brackets 13 and 14.

The inner column 22 is formed in a tubular shape extending along the first axis O1. An outer diameter of the inner column 22 is smaller than an inner diameter of the outer column 21. The inner column 22 is inserted into the outer column 21. The inner column 22 is configured to be movable in the first axis direction with respect to the outer column 21.

The shaft main body 12 is formed in a hollow cylindrical shape extending along the first axis O1. The shaft main body 12 is supported in the inner column 22 so as to be rotatable around the first axis O1 via a bearing (not shown). The steering wheel 2 is coupled to a rear end portion of the shaft main body 12.

The fixing brackets 13 and 14 connect between the outer column 21 and the vehicle body.

The front bracket 13 is formed in a U shape which opens downward in a front view when viewed in the first axis direction. The front bracket 13 supports the outer column 21 in a state where the front bracket 13 surrounds a front end portion of the outer column 21 from above and both sides in the right-left direction.

The rear bracket 14 is formed in a U shape which opens downward in the front view when viewed in the first axis direction. The rear bracket 14 supports the outer column 21 in a state where the rear bracket 14 surrounds a rear portion of the outer column 21 from above and both sides in the right-left direction.

An adjustment mechanism 25 is provided in the rear bracket 14. The adjustment mechanism 25 switches the inner column 22 between a locked state and an unlocked state. The locked state is a state in which a movement of the inner column 22 with respect to the outer column 21 in the up-down direction and the front-rear direction is restricted. The unlocked state is a state in which the movement of the inner column 22 with respect to the outer column 21 in the up-down direction and the front-rear direction is allowed.

<Intermediate Shaft>
The intermediate shaft 15 connects between the shaft main body 12 and a steering gear box (not shown) in an outside (for example, an engine room or the like) of a vehicle compartment. The intermediate shaft 15 extends downward from a front end portion of the shaft main body 12 toward the front.

Figure 2:
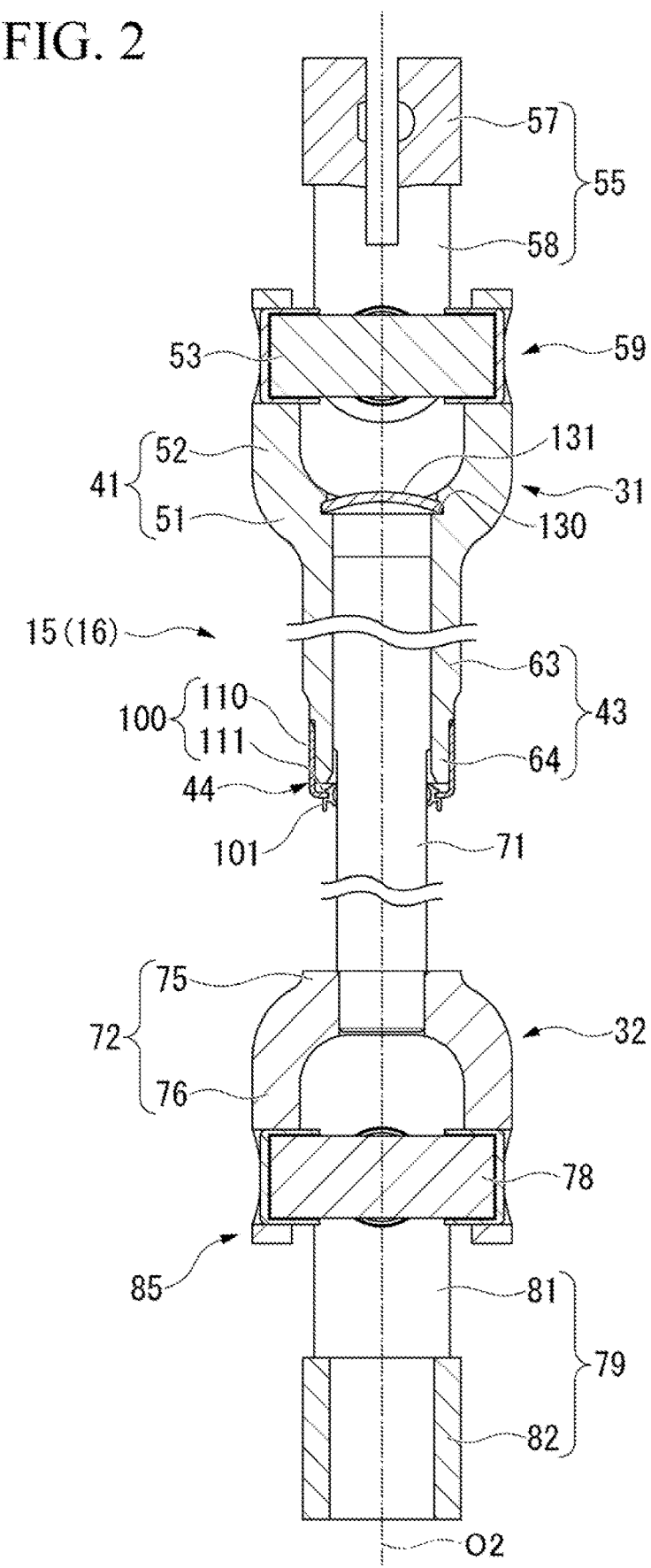
FIG. 2 is a cross-sectional view taken along line II-II of FIG. 1.

FIG. 2 is a cross-sectional view taken along line II-II of FIG. 1.

As shown in FIG. 2, the intermediate shaft 15 includes an upper shaft (outer shaft) 31 and a lower shaft (inner shaft) 32. The upper shaft 31 and the lower shaft 32 are coaxially disposed on a second axis O2 which intersects the above-described first axis O1. Therefore, in the following descriptions, a direction in which the second axis O2 extends may be simply referred to as a second axis direction, a direction orthogonal to the second axis O2 may be referred to as a second radial direction, and a direction around the second axis O2 may be referred to as a second circumferential direction. In the following descriptions, a direction toward the steering wheel 2 in the second axis direction is simply an upper side (second side) and a direction toward a side opposite to the steering wheel 2 is simply a lower side (first side).

The upper shaft 31 is connected to the front end portion of the shaft main body 12. The upper shaft 31 includes a first upper yoke 41, a tubular portion 43, and a seal mechanism 44.

The first upper yoke 41 includes a first upper base 51 and a first upper arm 52. The first upper base 51 has an annular shape which is disposed coaxially with the second axis O2. The first upper arm 52 extends to be bifurcated upward from the first upper base 51. A second upper yoke 55 is connected to the first upper arm 52 via an upper X-shaped shaft 53. Each first upper arm 52 rotatably supports two rotary shafts of four rotary shafts of the upper X-shaped shaft 53.

The second upper yoke 55 includes a second upper base 57 and a second upper arm 58.

The second upper base 57 is coupled to the front end portion of the above-described shaft main body 12.

The second upper arm 58 extends to be bifurcated downward from the second upper base 57. The second upper arm 58 rotatably supports the other two rotary shafts among the four rotary shafts of the above-described upper X-shaped shaft 53. The first upper yoke 41, the upper X-shaped shaft 53, and the second upper yoke 55 constitute an upper universal joint 59.

The tubular portion 43 extends downward from the first upper base 51. A female spline is formed on an inner peripheral surface of the tubular portion 43. An inner diameter of the tubular portion 43 is smaller than an inner diameter of the first upper base 51.

An outer diameter of the tubular portion 43 is gradually reduced downward. The tubular portion 43 includes a large-diameter portion 63 which is located on an upper portion thereof and a small-diameter portion 64 which is located below the large-diameter portion 63. The above-described seal mechanism 44 is attached to the small-diameter portion 64. The seal mechanism 44 will be described in detail later.

The lower shaft 32 is connected to a lower end portion of the upper shaft 31. The lower shaft 32 includes a shaft 71 and a first lower yoke 72.

The shaft 71 is a solid shaft which is disposed coaxially with the second axis O2. A male spline is formed on an outer peripheral surface of an upper portion of the shaft 71. The shaft 71 is inserted into the tubular portion 43 from below in a state where the shaft 71 engages (meshes) with the female spline of the upper shaft 31. The shaft 71 is configured to be slidable in the up-down direction (second axis direction) with respect to the upper shaft 31 in a state where a rotation of the shaft 71 in the second circumferential direction is restricted. The lower shaft 32 moves in the up-down direction with respect to the upper shaft 31, which absorbs a displacement in the second axis direction which is generated when the vehicle travels and suppresses a displacement and vibration transmitted to the steering wheel 2. An outer peripheral surface of a portion of the shaft 71 protruding forward from the upper shaft 31 is formed in a smooth surface.

The first lower yoke 72 protrudes downward from a lower end portion of the shaft 71. The first lower yoke 72 includes a first lower base 75 and a first lower arm 76. The first lower base 75 has an annular shape which is disposed coaxially with the second axis O2. The lower end portion of the shaft 71 is fitted into the first lower base 75. The first lower base 75 is connected to the shaft 71 by press fitting or the like.

The first lower arm 76 extends to be bifurcated downward from the first lower base 75. A second lower yoke 79 is connected to the first lower arm 76 via a lower X-shaped shaft 78. Each first lower arm 76 rotatably supports two rotary shafts of four rotary shafts of the lower X-shaped shaft 78.

The second lower yoke 79 includes a second lower arm 81 and a second lower base 82.

The second lower arm 81 rotatably supports the other two rotary shafts among the four rotary shafts of the above-described lower X-shaped shaft 78.

The second lower base 82 connects lower end portions of the second lower arm 81 to each other. The second lower base 82 is coupled to the steering gear box. In addition, the steering gear box includes a pinion shaft, a rack shaft, or the like. The pinion shaft is connected to the second lower base 82 and rotates as the intermediate shaft 15 rotates. The rack shaft extends in a vehicle width direction. Both end portions of the rack shaft in the vehicle width direction are connected to the wheel via tie rods or the like. The rack shaft is configured to be movable in the vehicle width direction as the pinion shaft rotates. That is, the intermediate shaft 15 rotates around the second axis O2 as the shaft main body 12 rotates, and thus, the rack shaft moves in the vehicle width direction and the wheel is steered. Moreover, the first lower yoke 72, the lower X-shaped shaft 78, and the second lower yoke 79 constitute a lower universal joint 85.

<Seal Mechanism>

Figure 3:
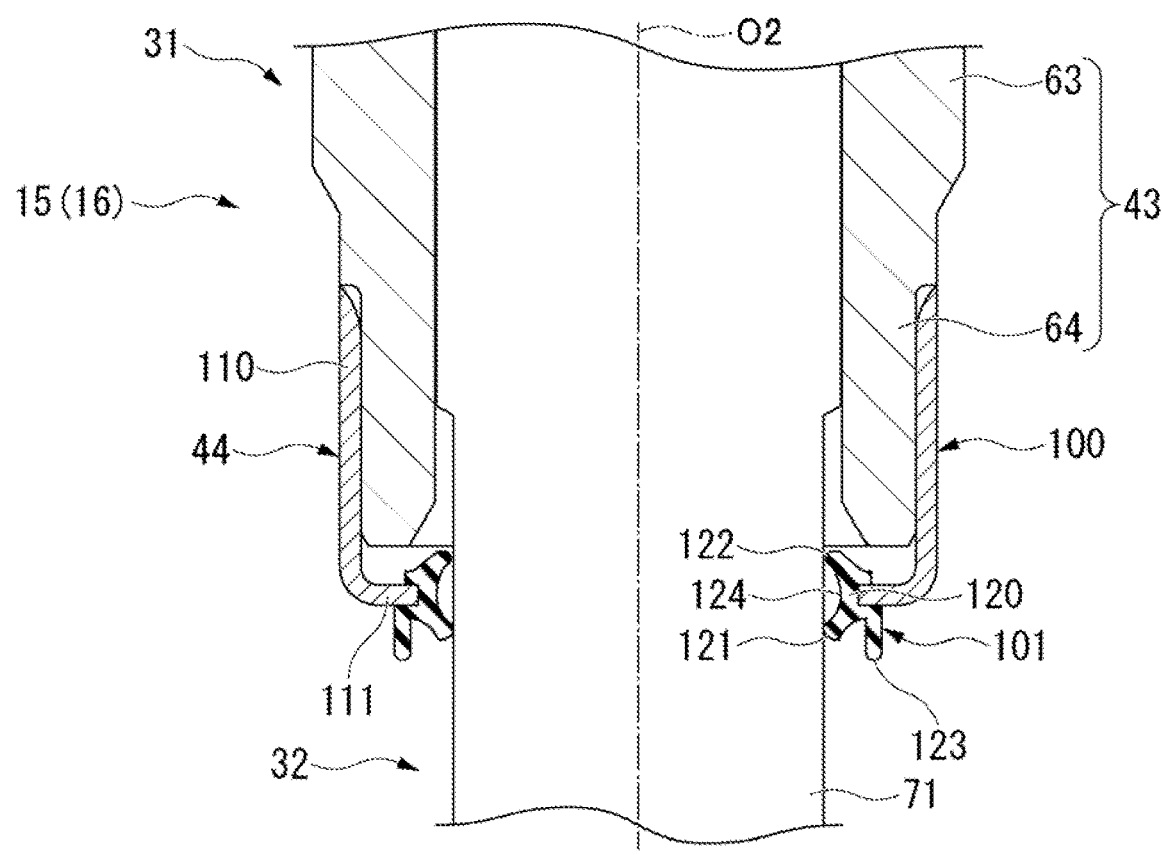
FIG. 3 is an enlarged cross-sectional view around a seal mechanism in an intermediate shaft.

FIG. 3 is an enlarged cross-sectional view around the seal mechanism 44 in the intermediate shaft 15.

As shown in FIG. 3, the seal mechanism 44 includes a seal holder 100 and a seal member 101.

The seal holder 100 includes a holding pipe 110 and an attachment flange 111.

The small-diameter portion 64 of the upper shaft 31 is fitted into the holding pipe 110.

The attachment flange 111 protrudes toward an inside in the second radial direction from a lower end edge of the holding pipe 110. The attachment flange 111 is close to an outer peripheral surface of the lower shaft 32.

The seal member 101 is interposed between the attachment flange 111 and the lower shaft 32. The seal member 101 seals between the attachment flange 111 and the lower shaft 32. The seal member 101 includes a root portion 120, a first lip portion 121, a second lip portion 122, and a flange portion 123.

The root portion 120 is attached to the entire periphery of an inner end edge of the attachment flange 111 in the second radial direction.

The first lip portion 121 protrudes from the root portion 120 to the inside in the second radial direction. A distal end portion of the first lip portion 121 comes into close contact with the outer peripheral surface of the lower shaft 32. In the present embodiment, the first lip portion 121 is inclined downward as the first lip portion 121 goes toward the inside in the second radial direction. Accordingly, the first lip portion 121 is configured to be flexibly deformable in the second radial direction.

The second lip portion 122 protrudes from the root portion 120 to the inside in the second radial direction. A distal end portion of the second lip portion 122 comes into close contact with the outer peripheral surface of the lower shaft 32. In the present embodiment, the second lip portion 122 is inclined upward as the second lip portion 122 goes toward the inside in the second radial direction. Accordingly, the second lip portion 122 is configured to be flexibly deformable in the second radial direction.

A portion of the seal member 101 surrounded by the first lip portion 121 and the second lip portion 122 constitutes a lubricant storage portion 124 in which lubricant is stored. Lubricant stored in the lubricant storage portion 124 is supplied to a portion between the lip portions 121 and 122 and the outer peripheral surface of the lower shaft 32, or the like.

The flange portion 123 protrudes downward from a portion of the root portion 120 located outside the first lip portion 121 in the second radial direction. The flange portion 123 surrounds the entire periphery around the first lip portion 121 and is formed in a tubular shape which is disposed coaxially with the second axis O2. However, a portion of the flange portion 123 in the second circumferential direction may be cut out or the like.

The flange portion 123 is formed to have a uniform diameter over the entire length in the second axis direction. However, the flange portion 123 may be configured to decrease or increase in diameter as the flange portion 123 goes downward.

A front end portion (lower end portion) of the flange portion 123 protrudes forward (downward) from the first lip portion 121. The flange portion 123 may be formed integrally with the seal holder 100.

Figure 4:
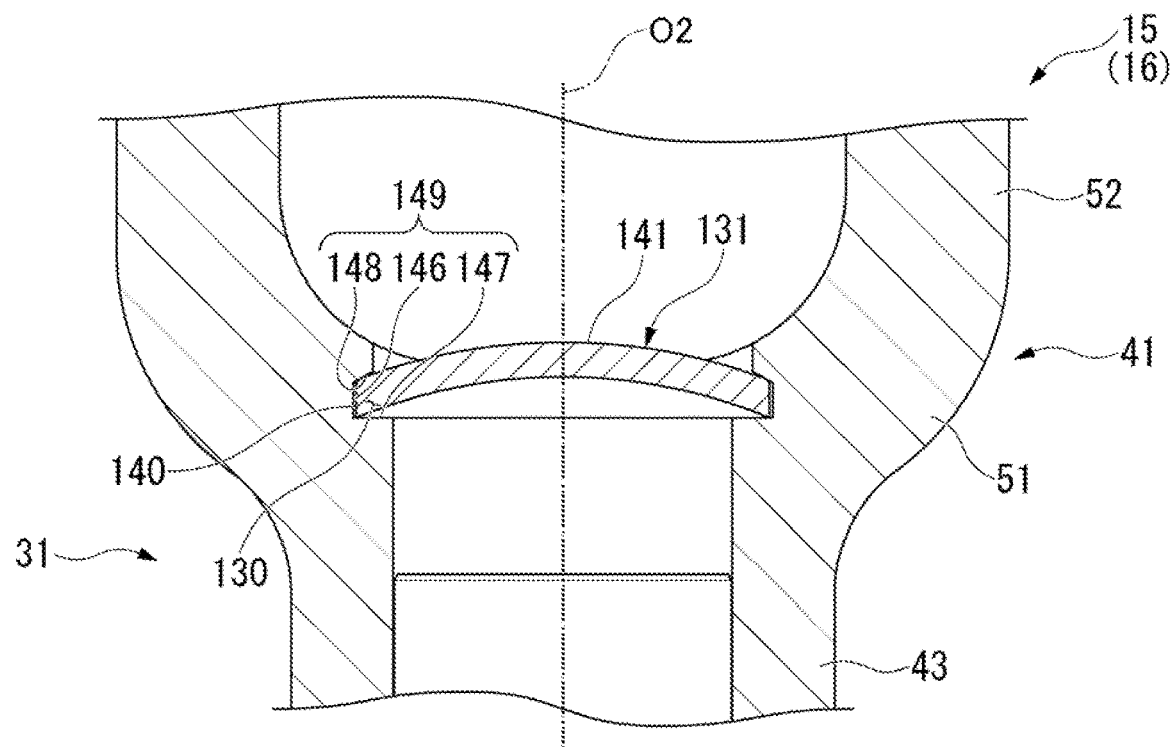
FIG. 4 is an enlarged cross-sectional view around a seal cap in the intermediate shaft.

FIG. 4 is an enlarged cross-sectional view around a seal cap 131 in the intermediate shaft 15.

As shown in FIG. 4, a portion defined by an inner peripheral surface of the first upper base 51 and an upper end surface of the tubular portion 43 constitutes a fitting recess 130. The fitting recess 130 opens toward the upper portion and to the inner side in the second radial direction, and is formed in an annular shape over the entire periphery of the first upper yoke 41.

The seal cap 131 is formed in a convex dome shape which has a top on the second axis O2 and faces upward. The seal cap 131 of the present embodiment is integrally formed of a plastically deformable material (for example, a metal material or the like). The seal cap 131 is held in the first upper base 51 (the fitting recess 130) in a state where an upper end opening portion (an opening portion on a second side) of the upper shaft 31 is closed. The seal cap 131 includes a seal 140 and a closure 141.

For example, the seal 140 is an outer peripheral end surface of the seal cap 131. The seal 140 is formed to have a flat surface extending along the second axis direction in a state where the seal cap 131 is assembled to the upper shaft 31. The seal 140 comes into close contact with an inner peripheral surface (in the present embodiment, the inner peripheral surface of the first upper base 51) along the second radial direction in an inner surface of the fitting recess 130 in the second radial direction. That is, a portion of the inner peripheral surface of the fitting recess 130 which comes into close contact with the seal 140 constitutes an abutment surface 146. The abutment surface 146 is formed in a flat surface extending along the second axis direction in a cross-sectional view. The shape of the seal 140 in the cross-sectional view can be appropriately changed following a shape of the abutment surface 146 in the cross-sectional view.

The closure 141 is continuous with an inner peripheral side of the seal 140. The closure 141 bulges upward as the closure 141 goes toward the inside in the second radial direction. The closure 141 closes the upper end opening portion of the upper shaft 31. A lower end outer peripheral edge of the closure 141 is close to or abuts against the upper end surface of the tubular portion 43 from above. That is, in the inner surfaces of the fitting recess 130, a surface (in the present embodiment, the upper end surface of the tubular portion 43) facing upward constitutes a lower restriction 147 which restricts a downward movement of the seal cap 131 relative to the upper shaft 31. In the present embodiment, the lower restriction 147 is formed on a flat surface orthogonal to the second axis direction in a cross-sectional view. However, the shape of the lower restriction 147 can be appropriately changed following a shape of the closure 141.

Meanwhile, in the inner peripheral surface of the fitting recess 130, an upper restriction 148 that protrudes inside the second radial direction is formed in a portion located above the abutment surface 146. The upper restriction 148 is formed over the entire periphery of an inner peripheral surface of the first upper base 51. An upper end outer peripheral edge of the closure 141 is close to or abuts against the upper restriction 148 from below in a state where the seal cap 131 is assembled. An inner peripheral edge of the upper restriction 148 is located outside an inner peripheral edge (inner peripheral surface of tubular portion 43) of the lower restriction 147 in the second radial direction. However, the inner peripheral edge of the upper restriction 148 may be located at the same position as that of the inner peripheral edge (inner peripheral surface of tubular portion 43) of the lower restriction 147 in the second radial direction. In the present embodiment, a lower surface of the upper restriction 148 is a curved surface which follows the upper surface of the closure 141 and is curved upward as the cured surface goes inward in the second radial direction. However, the lower surface of the upper restriction 148 may be formed in a flat surface orthogonal to the second axis direction or the like.

The above-described abutment surface 146, lower restriction 147, and upper restriction 148 constitute a storage groove 149. The storage groove 149 opens to the inside in the second radial direction in the fitting recess 130 and extends over the entire periphery of the inner peripheral surface of the first upper base 51. In the seal cap 131, the closure 141 is plastically deformed downward by an assembly method described later. The seal cap 131 is held in the first upper base 51 in a state where the seal 140 comes into close contact with the abutment surface 146 and an outer peripheral edge of the closure 141 is stored in the storage groove 149. In the present embodiment, a case where the lower restriction 147 of the fitting recess 130 is the upper end surface of the tubular portion 43 is described. However, the present invention is not limited to this configuration. The fitting recess 130 can be formed at any position in the upper shaft 31. That is, in the present embodiment, the case where a stepped portion formed between the inner peripheral surface of the first upper base 51 and the upper end surface of the tubular portion 43 is the fitting recess 130 is described. However, the present invention is not limited to this configuration. In the fitting recess 130, in a case where the inner peripheral surface of the first upper base 51 and the inner peripheral surface of the tubular portion 43 are formed to be flush with each other, a groove or the like which becomes a separate fitting recess 130 may be formed in the inner peripheral surface of the first upper base 51, the inner peripheral surface of the tubular portion 43, or the like.

<Method of Assembling Seal Cap>

Figure 5:
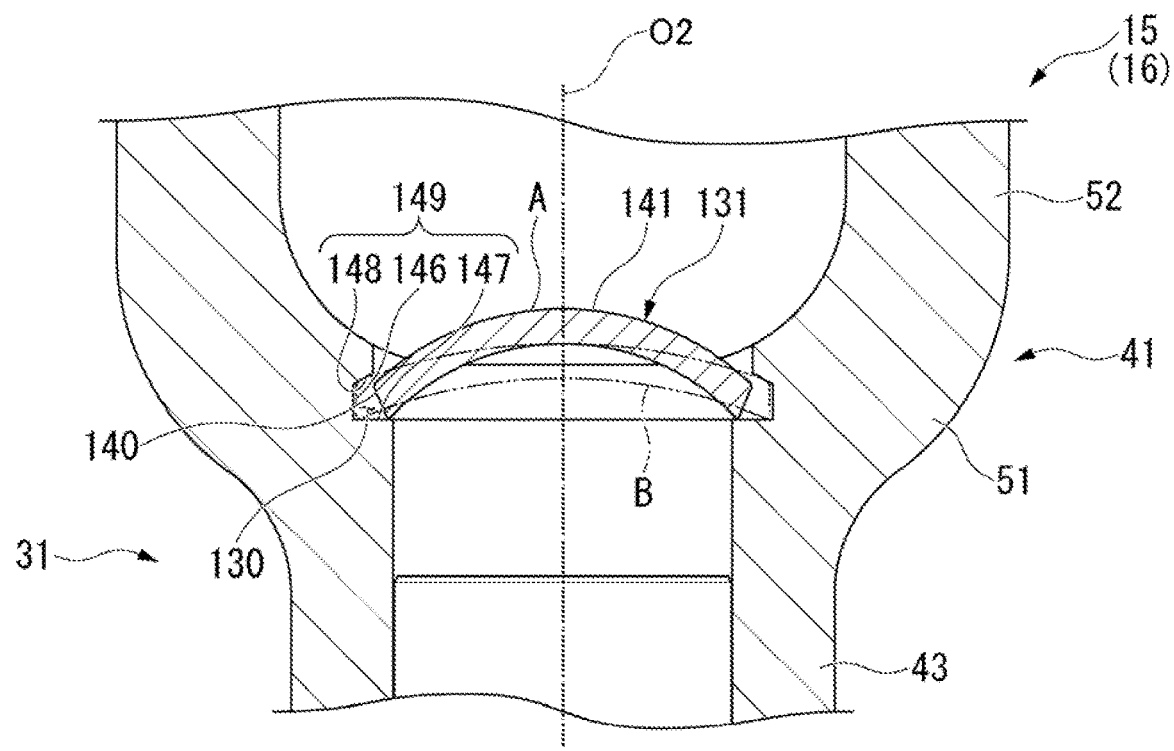
FIG. 5 is a process view for explaining a method of assembling the seal cap.

Next, a method of assembling the seal cap 131 will be described as a method of manufacturing the above-described intermediate shaft 15. FIG. 5 is a process view for explaining a method of assembling the seal cap 131. The method of assembling the seal cap 131 is performed before the second upper yoke 55 or the like is assembled.

The seal cap 131 of the present embodiment is assembled to the upper shaft 31 through an insertion step and a pushing step. As shown in FIG. 5, the seal cap 131 (solid line A in FIG. 5) before the assembly is formed in a dome shape having a large upward bulging amount compared to the seal cap 131 (chain line B in FIG. 5) after the assembly. An outer diameter of the seal cap 131 before the assembly is larger than the diameter (in the present embodiment, an inner diameter of the tubular portion 43) of the inner peripheral edge of the lower restriction 147 and is smaller than the diameter of the inner peripheral edge of the upper restriction 148.

In the insertion step, the seal cap 131 is set in the fitting recess 130 through the upper end opening portion of the upper shaft 31 in a state where a top of the closure 141 of the seal cap 131 faces upward. In this case, it is preferable to set the seal cap 131 in a state where the entire periphery of a lower end outer peripheral edge of the seal cap 131 is supported by the lower restriction 147.

In the pushing step, the closure 141 of the seal cap 131 is pushed-in downward from the upper end opening portion side of the upper shaft 31 by a punch or the like (not shown). In this case, the lower end outer peripheral edge of the seal cap 131 is supported by the lower restriction 147. Therefore, the closure 141 tends to be plastically deformed downward with respect to the seal 140. The seal cap 131 is deformed in a direction in which the bulging amount decreases and the outer diameter increases. That is, the closure 141 is displaced downward, and the seal 140 is displaced toward the outside in the second radial direction. Accordingly, the outer peripheral edge of the closure 141 is stored in the storage groove 149, and the seal 140 abuts against the abutment surface 146.

By pushing the closure 141 further downward in a state where the seal 140 abuts against the abutment surface 146, a seal load acting on the abutment surface 146 increases. When the seal load acting on the abutment surface 146 from the seal 140 reaches a desired value, the pushing is released. The seal load can be determined by a pushing load or the like input to the closure 141. In the present embodiment, the closure 141 is maintained in a dome shape (spherical shape) even after the assembly. However, the present invention is not limited to this configuration. If the closure 141 has a configuration which is not reversely deformed in the pushing step (a configuration in which the entire closure 141 is equivalent to the seal 140 in the second axis direction or is located below the seal 140), a portion (for example, top) of the closure 141 may be formed flat after plastic deformation.

As described above, the seal cap 131 is assembled to the upper shaft 31.

As described above, the closure 141 which is a convex dome shape directed upward is plastically deformed downward, and thus, the seal cap 131 of the present embodiment is held in the upper end opening portion of the upper shaft 31 in a state where the seal 140 is pressed against the abutment surface 146 of the upper shaft 31.

According to this configuration, the upper end opening portion of the upper shaft 31 is closed by the seal cap 131. Accordingly, it is possible to prevent water or the like from entering the fitting portion of the intermediate shaft 15 through the upper end opening portion of the upper shaft 31. Thereby, corrosion of the intermediate shaft 15 can be suppressed and durability can be improved. Accordingly, axial movements of the upper shaft 31 and the lower shaft 32 is smoothly performed over a long period of time.

In the present embodiment, the seal 140 is pressed against the abutment surface 146 of the upper shaft 31 by the plastic deformation of the closure 141, and thus, the seal load can be appropriately adjusted according to an amount of pushing of the closure 141. Accordingly, compared to a case where fitting dimensions or the like are managed to adjust the press-fitting load as in the related art, the dimensions are easily managed.

The assembly of the seal cap 131 is completed by pushing the closure 141. Accordingly, compared to a case where a caulking step is performed after press fitting as in the related art, manufacturing efficiency can be improved or a cost can be reduced.

As a result, the manufacturing efficiency is improved and the cost is reduced, and thus, it is possible to secure sealing performance between the seal cap 131 and the upper shaft 31 for a long period of time.

In the present embodiment, the upper shaft 31 includes the lower restriction 147 which restricts the downward movement of the seal cap 131.

According to this configuration, by setting the outer diameter of the seal cap 131 before the assembly larger than the inner diameter of the lower restriction 147, when the seal cap 131 is inserted into the upper shaft 31, the seal cap 131 with respect to the upper shaft 31 in the second axis direction can be positioned by the lower restriction 147. Accordingly, it is possible to improve the assembling property.

Meanwhile, the downward movement of the seal cap 131 with respect to the upper shaft 31 can be restricted by the lower restriction 147 even after the assembly. Accordingly, removal or the like of the seal cap 131 can be suppressed.

In the present embodiment, the upper restriction 148 which abuts against the seal cap 131 in the second axis direction in a state where the closure 141 is plastically deformed is formed on the upper shaft 31.

According to this configuration, the upward movement of the seal cap 131 with respect to the upper shaft 31 can be restricted by the upper restriction 148 after the assembly. Therefore, the removal or the like of the seal cap 131 can be suppressed.

The outer diameter of the seal cap 131 before assembly is smaller than the upper restriction 148. Accordingly, an interference between the seal cap 131 and the upper restriction 148 can be suppressed when the seal cap 131 is inserted into the upper shaft 31. As a result, it is possible to improve the assembling property.

In the present embodiment, in a state where the closure 141 is plastically deformed, the storage groove 149 which stores the outer peripheral edge of the seal cap 131 is formed over the entire periphery of the inner peripheral surface of the upper shaft 31.

According to this configuration, the entire periphery of the outer peripheral edge of the seal cap 131 is stored in the storage groove 149. Therefore, the seal cap 131 can be stably held in the upper shaft 31.

In the present embodiment, each of the upper shaft 31 and the seal cap 131 is formed in a circular shape in a plan view.

According to this configuration, a radius of the seal cap 131 can be formed uniformly over the entire periphery. Therefore, the seal 140 is easily spread evenly during the plastic deformation. As a result, the seal load can be applied uniformly to the entire periphery of the inner peripheral surface of the upper shaft 31.

The steering device 1 of the present embodiment includes the above-described intermediate shaft 15. Accordingly, the steering device 1 having excellent durability can be provided.

Other Modification Examples

Hereinbefore, the preferred embodiment of the present invention is described. However, the present invention is not limited to the embodiment. Additions, omissions, substitutions, and other modifications of configurations can be made within a scope which does not depart from the spirit of the present invention. The present invention is not limited by the above description, but only by the appended claims.

For example, in the above-described embodiment, the configuration in which the universal joints are provided at both upper and lower end portions of the intermediate shaft is described. However, the present invention is not limited to this configuration.

In the above-described embodiment, the configuration in which the seal cap 131 is assembled to the upper end opening portion of the tubular upper shaft 31 is described. However, the present invention is not limited to this configuration. In a case where the lower shaft 32 is tubular (outer shaft) and the upper shaft 31 is formed in a solid shaft (inner shaft), the seal cap may be fitted to the lower end opening portion of the lower shaft 32. In a case where both the upper shaft 31 and the lower shaft 32 are formed in a tubular shape, the seal cap may be fitted into at least one of the shafts.

In the above-described embodiment, the configuration in which the cross section of each of the lower shaft and the upper shaft is circular is described. However, the present invention is not limited to this configuration. Each of the lower shaft and the upper shaft may have a polygonal shape or the like in a cross-sectional view.

In the above-described embodiment, the intermediate shaft having the two-stage configuration of the lower shaft and the upper shaft is described as the slide shaft according to the present invention. However, the present invention is not limited to this configuration, and a three-stage configuration may be used.

In the above-described embodiment, the intermediate shaft which connects between the shaft main body 12 and the steering gear box is described as an example of the slide shaft according to the present invention. However, the present invention is not limited to this configuration. The present invention can also be applied to a configuration in which the shaft main body 12 is a slide shaft.

In the above-described embodiment, the configuration in which the outer peripheral edge of the seal cap 131 is stored in the fitting recess 130 is described. However, a configuration in which the fitting recess 130 is not provided may be used. That is, any configuration may be adopted as long as the seal 140 of the seal cap 131 comes into contact with the inner peripheral surface of the outer shaft.

Moreover, in the above-described embodiment, the configuration in which the surfaces of the storage groove 149 facing the second axis direction function as the restrictions 147 and 148 is described. However, the present invention is not limited to this configuration. For example, the upper restriction and the lower restriction which protrude from the inner peripheral surface of the outer shaft to the inside in the second radial direction may be formed independently. Each restriction may be formed continuously on the entire periphery in the second circumferential direction or intermittently in the second circumferential direction on the inner peripheral surface of the outer shaft.

In the above-described embodiment, the configuration in which the seal cap 131 is formed in a dome shape is described. However, the present invention is not limited to this configuration. For example, the seal cap may be configured to have a plastically deformable closure such as a bottomed tubular shape. In this case, the closure may be formed of a plastically deformable material and the seal may be formed of an elastically deformable material.

In addition, components in the above-described embodiment can be appropriately replaced with known components within a scope which does not depart from the spirit of the present invention, and the above-described modification example may be appropriately combined with each other.

What is claimed is:

1. A steering shaft comprising:
    a tubular outer shaft;
    an inner shaft configured to be inserted into the outer shaft, to be movable in an axial direction relative to the outer shaft through an opening portion of the outer shaft on a first side in the axial direction, and to be rotatable integrally with the outer shaft; and
    a seal cap configured to close an opening portion of the outer shaft on a second side in the axial direction,
    wherein the seal cap includes
    a seal configured to come into close contact with an inner peripheral surface of the outer shaft, and
    a closure configured to be continuous with an inner peripheral side of the seal and bulge to the second side in the axial direction with respect to the seal,
    wherein the closure is plastically deformed to the first side in the axial direction, and thus, the seal cap is held in the opening portion on the second side in a state where the seal is pressed against the inner peripheral surface of the outer shaft, and
    wherein a first restriction configured to abut against the seal cap in the axial direction in a state where the closure is plastically deformed and restrict a movement of the seal cap with respect to the outer shaft toward the second side in the axial direction is formed in a portion of the outer shaft located on the second side in the axial direction from the seal.

2. The steering shaft according to claim 1,
    wherein a second restriction configured to abut against the seal cap in the axial direction and restrict a movement of the seal cap with respect to the outer shaft toward the first side in the axial direction is formed in a portion of the outer shaft located on the first side in the axial direction from the seal.

3. The steering shaft according to claim 1,
    wherein each of the outer shaft and the seal cap is formed in a circular shape when viewed in the axial direction.

4. A method of manufacturing a steering shaft,
    wherein the steering shaft includes:
    a tubular outer shaft;
    an inner shaft configured to be inserted into the outer shaft, to be movable in an axial direction relative to the outer shaft through an opening portion of the outer shaft on a first side in the axial direction, and to be rotatable integrally with the outer shaft; and a seal cap configured to close an opening portion of the outer shaft on a second side in the axial direction, wherein the seal cap includes a seal configured to come into close contact with an inner peripheral surface of the outer shaft, and a closure configured to be continuous with an inner peripheral side of the seal and bulge to the second side in the axial direction with respect to the seal, wherein the closure is plastically deformed to the first side in the axial direction, and thus, the seal cap is held in the opening portion on the second side in a state where the seal is pressed against the inner peripheral surface of the outer shaft, wherein the method comprises a pushing step of pushing the closure to the first side in the axial direction with respect to the seal in a state where the seal cap is inserted into the opening portion on the second side of the outer shaft, and wherein in the pushing step, the closure is plastically deformed toward the first side in the axial direction, and thus, the seal comes into close contact with the inner peripheral surface of the outer shaft.

5. A steering shaft comprising:

a tubular outer shaft;

an inner shaft configured to be inserted into the outer shaft, to be movable in an axial direction relative to the outer shaft through an opening portion of the outer shaft on a first side in the axial direction, and to be rotatable integrally with the outer shaft; and a seal cap configured to close an opening portion of the outer shaft on a second side in the axial direction, wherein the seal cap includes a seal configured to come into close contact with an inner peripheral surface of the outer shaft, and a closure configured to be continuous with an inner peripheral side of the seal and bulge to the second side in the axial direction with respect to the seal, wherein the seal cap is held in the opening portion on the second side in a state where the seal is pressed against the inner peripheral surface of the outer shaft, and wherein a first restriction configured to abut against the seal cap in the axial direction and restrict a movement of the seal cap with respect to the outer shaft toward the second side in the axial direction is formed in a portion of the outer shaft located on the second side in the axial direction from the seal.

* * * * *